(12) United States Patent
Takaragi

(10) Patent No.: US 7,159,121 B2
(45) Date of Patent: Jan. 2, 2007

(54) TRANSMISSION OF INFORMATION TO A REPRODUCTION DEVICE HAVING USER IDENTIFICATION BY ORGANISM INFORMATION OF A SPECIFIED TYPE

(75) Inventor: Yoichi Takaragi, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 845 days.

(21) Appl. No.: 09/740,860

(22) Filed: Dec. 21, 2000

(65) Prior Publication Data

US 2001/0007130 A1 Jul. 5, 2001

(30) Foreign Application Priority Data

Dec. 27, 1999 (JP) ............................ 11-371412

(51) Int. Cl.
H04L 9/32 (2006.01)
H04L 9/30 (2006.01)
G06K 9/00 (2006.01)

(52) U.S. Cl. ................. 713/186; 382/115; 726/28; 340/5.82

(58) Field of Classification Search ............... 713/186, 713/182, 185, 200; 382/115, 124; 380/243, 380/246, 30; 726/27, 28; 340/5.52, 5.53, 340/5.8, 5.82, 5.83, 5.84, 5.86
See application file for complete search history.

(56) References Cited

U.S. PATENT DOCUMENTS

| | | | |
|---|---|---|---|
| 5,227,871 A | 7/1993 | Funada et al. | |
| 5,363,202 A | 11/1994 | Udagawa et al. | |
| 5,363,454 A | 11/1994 | Udagawa et al. | |
| 5,430,525 A | 7/1995 | Ohta et al. | |
| 5,481,377 A | 1/1996 | Udagawa et al. | |
| 5,633,932 A * | 5/1997 | Davis et al. ................. | 713/176 |
| 5,731,880 A | 3/1998 | Takaragi et al. | |
| 5,847,849 A | 12/1998 | Funada et al. | |
| 5,917,938 A | 6/1999 | Funada et al. | |
| 5,933,520 A | 8/1999 | Ishimoto et al. | |
| 5,949,903 A | 9/1999 | Outa et al. | |
| 6,024,287 A * | 2/2000 | Takai et al. ................. | 235/493 |
| 6,256,737 B1 * | 7/2001 | Bianco et al. .............. | 713/186 |
| 6,378,070 B1 * | 4/2002 | Chan et al. ................. | 713/155 |
| 6,697,947 B1 * | 2/2004 | Matyas et al. .............. | 713/182 |

FOREIGN PATENT DOCUMENTS

| | | |
|---|---|---|
| JP | 5-341945 | 12/1993 |
| JP | 7-152520 | 6/1995 |
| JP | 10-275203 | 10/1998 |

* cited by examiner

Primary Examiner—Gilberto Barron, Jr.
Assistant Examiner—Zachary Davis
(74) Attorney, Agent, or Firm—Fitzpatrick, Cella, Harper & Scinto

(57) ABSTRACT

In a printing system, an information reception apparatus, such as a printer or the like, is allowed to more assuredly identify a specific user by using organism information of the user. Fingerprint readers read a fingerprint pattern of the user as image data. Pointing device including a keyboard, a mouse and the like is used when forming or editing print data. The print data and the fingerprint pattern subjected to encryption are transmitted from a computer to the printer via a data transmission channel. The fingerprint pattern transmitted from the computer is decoded. After authenticating the user by performing matching between the decoded fingerprint pattern and the fingerprint pattern read by the fingerprint reader, the print data is printed.

17 Claims, 13 Drawing Sheets

|  | FINGERPRINT DATA | RETINA DATA | VOICE DATA |
|---|---|---|---|
| USER A | FINGERPRINT A | RETINA A | VOICE A |
| USER B | FINGERPRINT B | RETINA B | VOICE B |
| USER C | FINGERPRINT C | RETINA C | VOICE C |

TRANSMISSION OF INFORMATION TO A REPRODUCTION DEVICE HAVING USER IDENTIFICATION BY ORGANISM INFORMATION OF A SPECIFIED TYPE

BACKGROUND OF THE INVENTION

1. Field of the Invention

The present invention relates to a technique for assuredly reproducing information formed or edited by a user before the user's eyes when transmitting the information to an information reception apparatus, such as a printer or the like, connected to an information transmission apparatus, such as a computer or the like.

2. Description of the Related Art

A technique of transferring print data from a computer to a printer, and starting to output print information based on an instruction only from a regular user at the printer has been known (see Japanese Patent Application Laid-Open (Kokai) No. 7-152520 (1995)).

An information processing apparatus which discriminates a particular user utilizing an organism information, such as fingerprint information or the like, and determines whether or not the user is authorized to use the apparatus has also been known (see Japanese Patent Application Laid-Open (Kokai) No. 5-341945 (1993)).

In the conventional approach of transferring print data from a computer to a printer, and starting to output print information based on an instruction only from a regular user by inputting a password at the printer, there is the problem that when if password is leaked to a third party, it is impossible to start to output print information based on an instruction from only a regular user.

If it is intended to deal with the above-described problem using the technique of discriminating a particular user by utilizing organism information, such as fingerprint information or the like, it is necessary to transmit information relating to the person's secret, such as fingerprint information or the like, via a transmission channel of a network, and hold the information in an apparatus (a printer), thereby causing a problem from the viewpoint of preservation of the person's secret information.

SUMMARY OF THE INVENTION

It is an object of the present invention to realize preservation of secret information, in consideration of the above-described problems.

It is another object of the present invention to provide a method for preserving secret information which is adapted to a printer.

It is still another object of the present invention to provide an information transmission apparatus and an information reception apparatus, such as a printer or the like, in which the information reception apparatus is allowed to more assuredly identify a particular user by using organism information of the user, a method for controlling these apparatuses, and a system or a storage medium suitable for these apparatuses.

It is yet another object of the present invention to provide an information transmission apparatus and an information reception apparatus having new functions, and a method for controlling these apparatuses.

According to one aspect, the present invention which achieves these objectives relates to an information transmission apparatus for transmitting information formed or edited by a user to an external information reception apparatus. The information transmission apparatus includes input means for inputting identification information for identifying the user, encryption means for generating encryption information from the identification information input by the input means, and transmission means for transmitting both of the encryption information and the information to be transmitted to the information reception apparatus.

According to another aspect, the present invention which achieves these objectives relates to an information reception apparatus for reproducing information transmitted from a transmission apparatus. The information reception apparatus includes reception means for receiving information to be reproduced together with encryption information, restoration means for generating restored information by restoring the encryption information received by the reception means, input means for inputting identification information for identifying a user, transformation means for transforming the identification information into the same data format as a data format of the restored information, matching means for performing matching between information obtained by transforming the identification information by the transformation means and the restored information, and reproduction means for reproducing the information transmitted from the transmission apparatus when the matching can be performed by the matching means.

According to still another aspect, the present invention which achieves these objectives relates to a system including an information transmission apparatus for transmitting information formed or edited by a user to an external apparatus, and an information reception apparatus for receiving and reproducing the information from the information transmission apparatus. The information transmission apparatus includes input means for inputting identification information for identifying the user, encryption means for generating encryption information from the identification information input by the input means, and transmission means for transmitting both of the encryption information and the information to be transmitted, to the information reception apparatus. The information reception apparatus includes reception means for receiving the information transmitted from the transmission means, restoration means for generating restored information by restoring the encryption information received by the reception means, input means for inputting identification information for identifying a user, transformation means for transforming the identification information into the same data format as a data format of the restored information, matching means for performing matching between information obtained by transforming the identification information by the transformation means and the restored information, and reproduction means for reproducing the information transmitted from the transmission apparatus when the matching can be performed by the matching means.

According to yet another aspect, the present invention which achieves these objectives relates to an information transmission apparatus for transmitting information formed or edited by a user to an external information reception apparatus. The information transmission apparatus includes input means for inputting a frequency spectrum based on identification information for identifying the user, encryption means for generating encryption information from the frequency spectrum input by the input means, and transmission means for transmitting both of the encryption information and information to be transmitted to the information reception apparatus.

According to yet a further aspect, the present invention which achieves these objectives relates to an information reception apparatus for reproducing information transmitted from a transmission apparatus. The information reception apparatus includes reception means for receiving information to be reproduced, together with encryption information, restoration means for generating restored information by restoring the encryption information received by the reception means, input means for inputting a frequency spectrum based on identification information for identifying a user, matching means for performing matching between the frequency spectrum and the restored information, and reproduction means for reproducing the information transmitted from the transmission apparatus when the matching can be performed by the matching means.

According to still another aspect, the present invention which achieves these objectives relates to a system including an information transmission apparatus for transmitting information formed or edited by a user to an external apparatus, and an information reception apparatus for receiving and reproducing the information from the information transmission apparatus. The information transmission apparatus includes input means for inputting a frequency spectrum based on identification information for identifying the user, encryption means for generating encryption information from the frequency spectrum information input by the input means, and transmission means for transmitting both of the cipher information and information to be transmitted, to the information reception apparatus. The information reception apparatus includes reception means for receiving information transmitted from the transmission apparatus, restoration means for generating restored information by restoring the encryption information received by the reception means, input means for inputting the frequency spectrum based on the identification information for identifying the user, matching means for performing matching between the frequency spectrum and the restored information, and reproduction means for reproducing the information transmitted from the information transmission apparatus when the matching can be performed by the matching means.

According to still another aspect, the present invention which achieves these objectives relates to a method for controlling an information transmission apparatus for transmitting information formed or edited by a user to an external information reception apparatus. The method includes an input step of inputting identification information for identifying the user, an encryption step of generating encryption information from the identification information input in the input step, and a transmission step of transmitting both of the encryption information and the information to be transmitted, to the information reception apparatus.

According to still another aspect, the present invention which achieves these objectives relates to a method for controlling an information reception apparatus for reproducing information transmitted from a transmission apparatus. The method includes a reception step of receiving information to be reproduced, together with encryption information, a restoration step of generating restored information by restoring the encryption information received in the reception step, an input step of inputting identification information for identifying a user, a transformation step of transforming the identification information into the same data format as a data format of the restored information, a matching step of performing matching between information obtained by transforming the identification information in the transformation step and the restored information, and a reproduction step of reproducing the information transmitted from the transmission apparatus when the matching can be performed in the matching step.

According to still another aspect, the present invention which achieves these objectives relates to a method for controlling a system including an information transmission apparatus for transmitting information formed or edited by a user to an external apparatus, and an information reception apparatus for receiving and reproducing the information from the information transmission apparatus. A method for controlling the information transmission apparatus includes an input step of inputting identification information for identifying the user, an encryption step of generating encryption information from the identification information input in the input step, and a transmission step of transmitting both of the encryption information and the information to be transmitted, to the information reception apparatus. A method for controlling the information reception apparatus includes a reception step of receiving the information transmitted in the transmission step, a restoration step of generating restored information by restoring the encryption information received in the reception step, an input step of inputting identification information for identifying a user, a transformation step of transforming the identification information into the same data format as a data format of the restored information, a matching step of performing matching between information obtained by transforming the identification information in the transformation step and the restored information, and a reproduction step of reproducing the information transmitted from the information transmission apparatus when the matching can be performed in the matching step.

According to still another aspect, the present invention which achieves these objectives relates to a method for controlling an information transmission apparatus for transmitting information formed or edited by a user to an external information reception apparatus. The method includes an input step of inputting a frequency spectrum based on identification information for identifying the user, an encryption step of generating encryption information from the frequency spectrum input in the input step, and a transmission step of transmitting the encryption information and information to be transmitted to the information reception apparatus.

According to still another aspect, the present invention which achieves these objectives relates to a method for controlling an information reception apparatus for reproducing information transmitted from a transmission apparatus. The method includes a reception step of receiving information to be reproduced, together with encryption information, a restoration step of generating restored information by restoring the encryption information received in the reception step, an input step of inputting a frequency spectrum based on identification information for identifying a user, a matching step of performing matching between the frequency spectrum and the restored information, and a reproduction step of reproducing the information transmitted from the transmission apparatus when the matching can be performed in the matching step.

According to still another aspect, the present invention which achieves these objectives relates to a method for controlling a system including an information transmission apparatus for transmitting information formed or edited by a user, and an information reception apparatus for receiving and reproducing the information from the information transmission apparatus. A method for controlling the information transmission apparatus includes an input step of inputting a frequency spectrum based on identification information for identifying the user, an encryption step of generating encryption information from the frequency spectrum information input in the input step, and a transmission step of transmitting both of the encryption information and information to be transmitted, to the information reception apparatus. A method for controlling the information reception apparatus includes a reception step of receiving information transmitted in the transmission step, a restoration step of generating restored information by restoring the encryption information received in the reception step, an input step of inputting a frequency spectrum based on an identification information for identifying a user, a matching step of performing matching between the frequency spectrum and the restored information, and a reproduction step of reproducing the information transmitted from the transmission apparatus when the matching can be performed in the matching step.

According to still another aspect, the present invention which achieves these objectives relates to program codes operating as an information transmission apparatus for transmitting information formed or edited by a user to an external information reception apparatus, by being read and executed by a computer. The program codes include program codes for an input step of inputting identification information for identifying the user, program codes for an encryption step of generating encryption information from the identification information input in the input step, and program codes for a transmission step of transmitting both of the encryption information and the information to be transmitted, to the information reception apparatus.

The foregoing and other objects, advantages and features of the present invention will become more apparent from the following description of the preferred embodiments taken in conjunction with the accompanying drawings.

DESCRIPTION OF THE PREFERRED EMBODIMENTS

Preferred embodiments of the present invention will now be described with reference to the drawings.

Although in the following embodiments, a printer (an image forming apparatus) is used as an apparatus for receiving or reproducing information, the apparatus is not limited to a printer. Any other appropriate apparatus which can reproduce information to be reproduced, such as an image, voice, character information or the like, in accordance with the type of the information. For example, a facsimile apparatus may be used instead of a printer when information to be reproduced is character information.

Furthermore, organism information of a user used by himself is not limited to information described in the following embodiments. Any information other than a fingerprint, such as voice, a retina or the like, may also be used.

First Embodiment

In a first embodiment of the present invention, print data is transmitted from a computer (an image processing apparatus) to a printer, and a fingerprint is used as authentication information relating to the user when causing the printer to perform printing. The first embodiment will now be described in detail.

Figure 1:
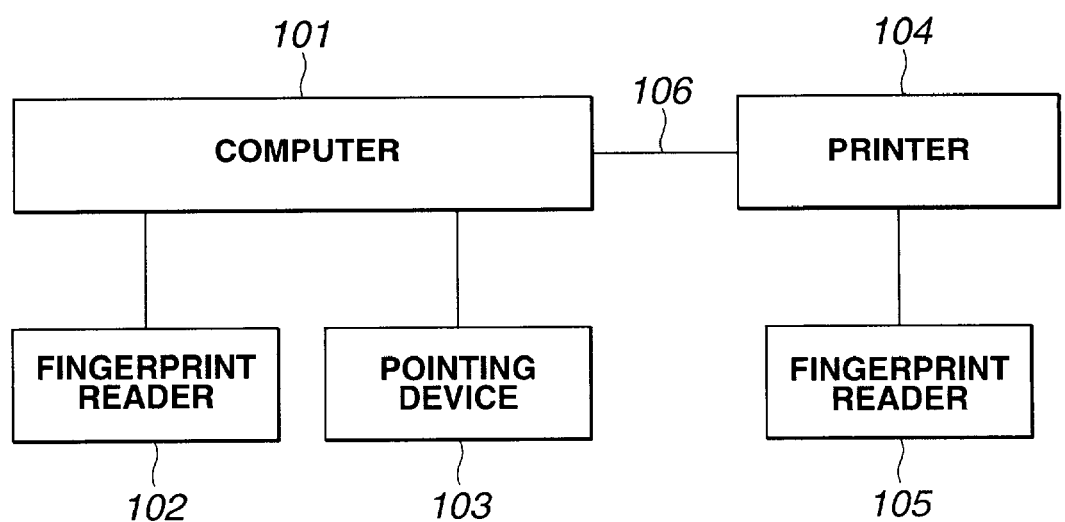
FIG. 1 is a block diagram illustrating a system according to a first embodiment of the present invention.

FIG. 1 is a block diagram illustrating a system using a computer and a printer according to the first embodiment.

In FIG. 1, a computer 101 serves as an information transmission apparatus. Fingerprint readers 102 and 105 read a fingerprint pattern of the user as image data, and transmit the image data to the computer 101 and a printer 104, respectively. A pointing device 103 includes a keyboard, a mouse and the like, and is used when forming or editing print data to be transmitted from the computer 101 to the printer 104. The print data and a fingerprint pattern subjected to encryption are transmitted from the computer 101 to the printer 104 via a data transmission channel 106. The printer 104 decodes the fingerprint pattern subjected to encryption transmitted from the computer 101, and prints the print data when the decoded fingerprint pattern matches with the fingerprint pattern read by the fingerprint 105 and the result of the matching is authenticated.

Figure 12:
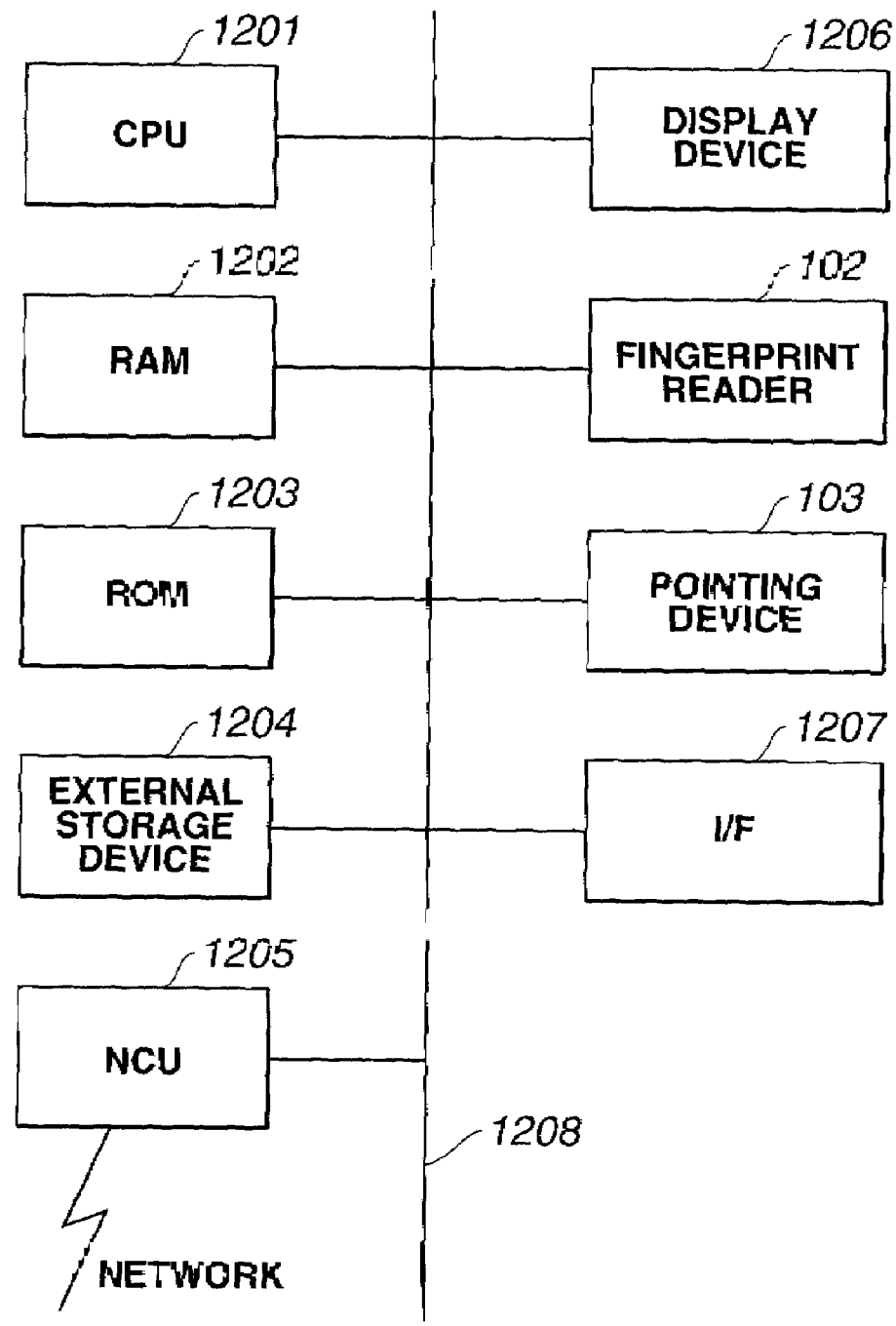
FIG. 12 is a block diagram of the computer.

The computer 101, serving as the information transmission apparatus, will now be described with reference to the block diagram shown in FIG. 12.

A CPU (central processing apparatus) 1201, such as a microprocessor or the like, executes various program codes (to be described later) stored in a RAM (random access memory) 1202, and also includes areas for temporarily storing data being processed during execution of program codes. The CPU 1201 also executes program codes for starting the computer 101 and performing settings to be thereafter required which are stored in a ROM (read-only memory) 1203.

The RAM 1202 reads various program codes, for example, for performing encryption of a fingerprint pattern and controlling formation and editing of print data, from an external storage device 1204, and stores the read program codes. For example, data generated when performing encryption of a fingerprint pattern is also stored in the RAM 1202 whenever necessary.

The ROM 1203 stores program codes for starting the computer 101, data for setting required after starting the computer 101, character codes used in the computer 101, and the like.

The external storage device 1204 stores various program codes installed from a CD(compact disc)-ROM, a floppy disk or the like (for example, for performing encryption of a fingerprint pattern, controlling formation and editing of print data, as described above).

An NCU (network control unit) 1205 is used for communication between respective sets of application software requiring a fingerprint pattern subjected to encryption, print data and the like.

A display device 1206 displays a control message during the above-described encryption processing as character information or image information, and also displays a transmission control command, an error message from the system, and the like. Such display information can also be output to an external apparatus via the NCU 1205.

An interface unit (hereinafter abbreviated as an "I/F") 1207 can perform transmission/reception of information with an external apparatus using a communication network or the like. The I/F 1207 performs transmission/reception of information with the printer 104, and is used, for example, when transmitting a fingerprint pattern subjected to encryption and print data to the printer 104.

A bus 1208 interconnects the above-described respective units.

The computer 101 may be a general-purpose personal computer.

Figure 13:
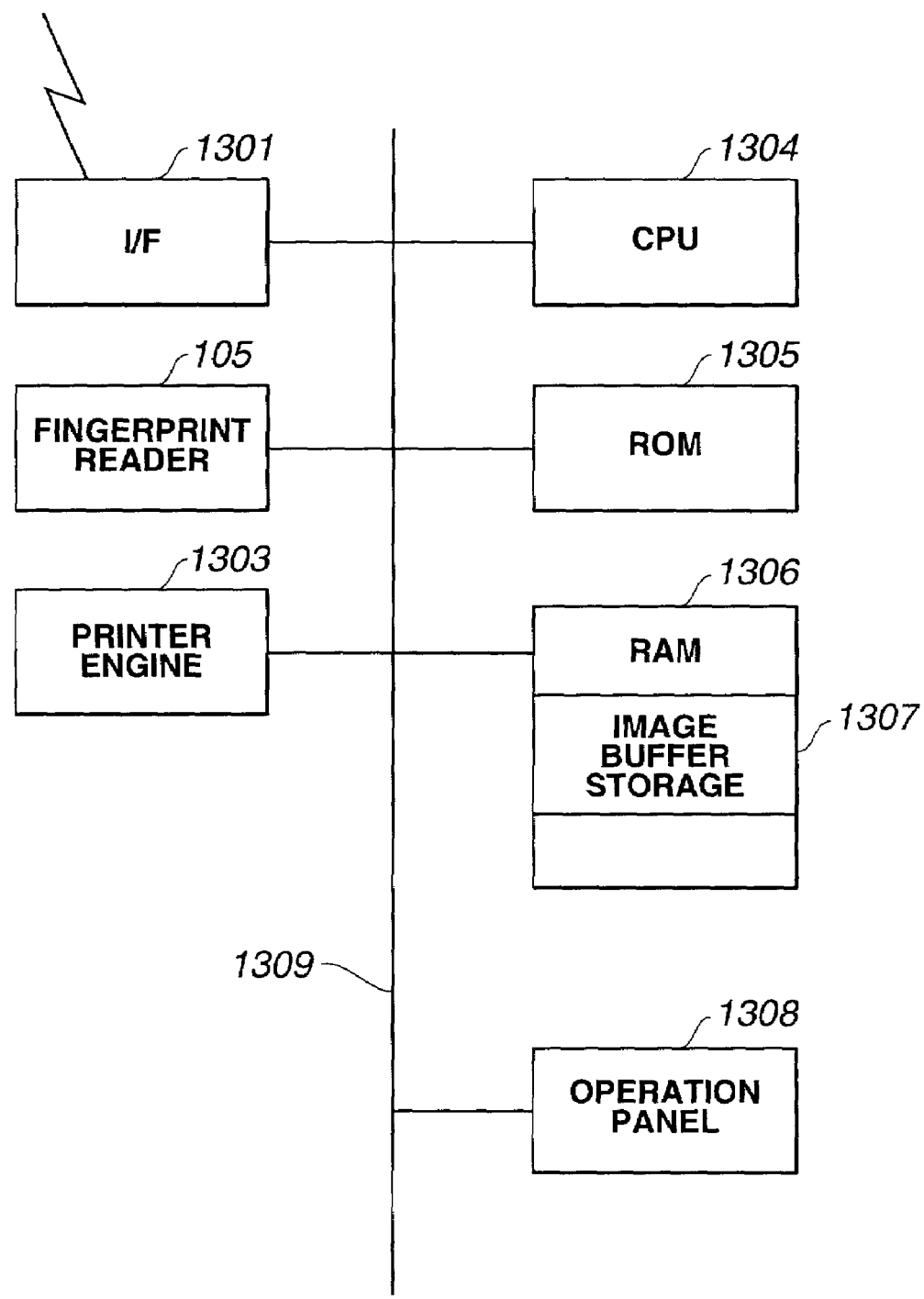
FIG. 13 is a block diagram of the printer.

The printer 104, serving as an information reception apparatus, will now be described in detail with reference to the block diagram shown in FIG. 13.

A user interface (hereinafter abbreviated as an "I/F") 1301 can perform transmission/reception of information with an external apparatus using a communication network or the like. The I/F 1301 performs transmission/reception of information with the computer 101, and is used, for example, when receiving a fingerprint pattern subjected to encryption and print data from the computer 101.

A printer engine 1303 acquires print data from an image buffer storage 1302 included in a RAM 1306 and outputs the acquired data when printing the print data.

A CPU 1304 executes various program codes stored in a ROM 1305. The stored program codes include various control program codes for the printer 104, various processing program codes for authenticating a user, and the like.

The ROM 1305 stores character codes to be output by the printer 104, and the like, in addition to the program codes.

The RAM 1306 includes an image buffer storage 1307 (to be described later), and is also used as areas necessary for processing by the CPU 1304.

The image buffer storage 1307 can temporarily store print data received from the computer 101 via the I/F 1301.

An operation panel 1308 can provide, change and control various types of setting for the printer 104.

A bus 1309 interconnects the above-described respective units.

Figure 2:
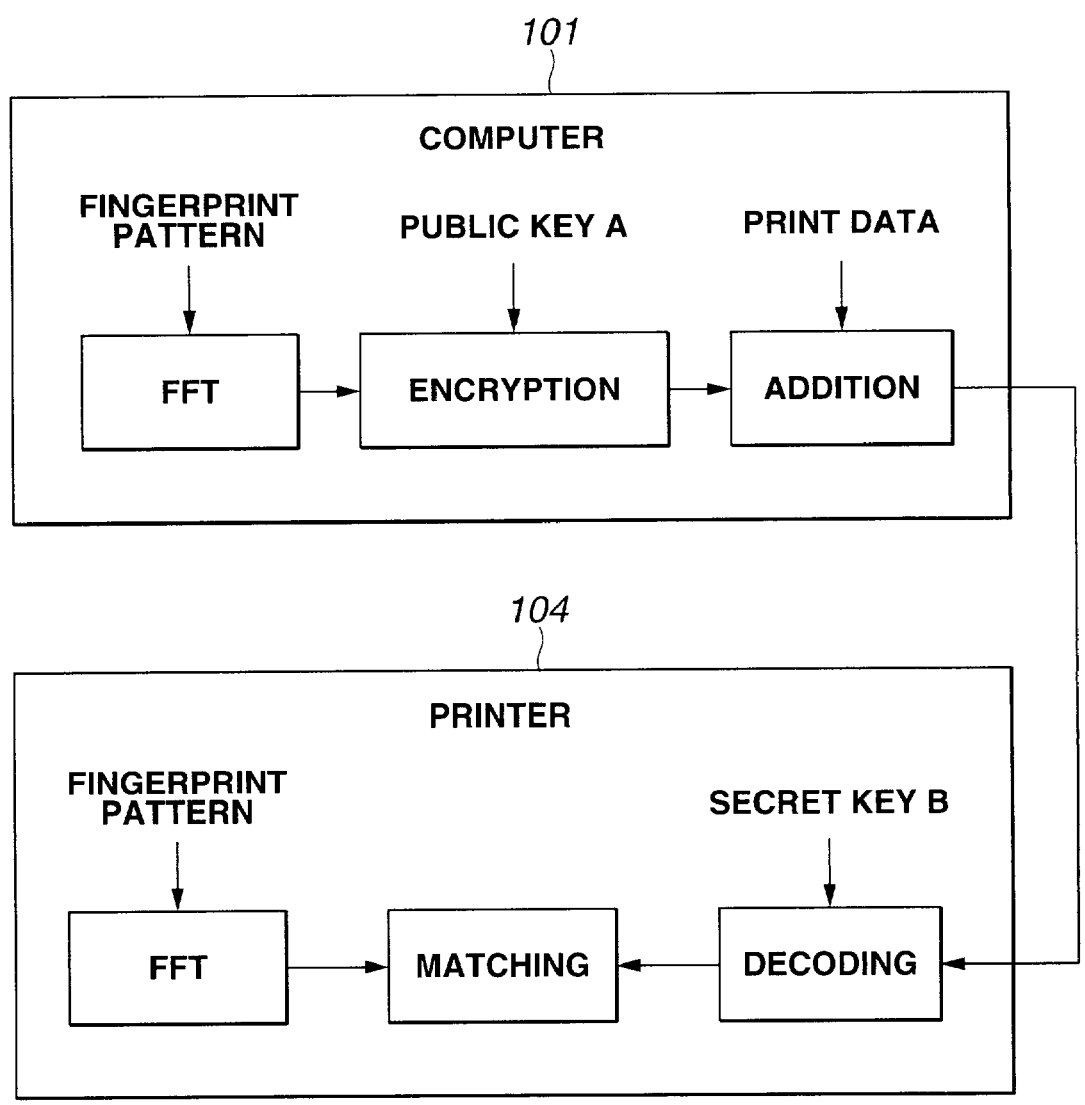
FIG. 2 is a diagram illustrating the contents of processing in the first embodiment.

FIG. 2 is a block diagram illustrating the operations of the computer 101 and the printer 104 in the first embodiment.

First, the computer 101 performs data transformation of image data of a fingerprint pattern read by the fingerprint reader 102 shown in FIG. 12 according to a method shown in FIG. 5 (FFT (fast Fourier transform), to be described later), and generates a fingerprint-image frequency spectrum. The fingerprint-image frequency spectrum is subjected to encryption according to public-key cryptography shown in FIG. 8 (to be described later). The generated fingerprint-image frequency spectrum subjected to encryption is added to print data, and the resultant data is transmitted to the printer 104.

As for the data transformation of the image data of the fingerprint pattern, any appropriate method other than FFT may be used, provided that the image data is transformed into frequency data of the image data. For example, a method for transforming the data into frequency data, such as wavelet transform or DCT (discrete cosine transform) may be used. In another approach for performing encryption of image data of a fingerprint pattern, the image data of the fingerprint pattern is embedded in print data using known electronic watermark.

The printer 104 first performs data transformation of image data of a fingerprint pattern read by the fingerprint reader 105 using the same FFT as that executed in the computer 101, in order to provide the same data format as that of the image data included in the data received from the computer 101. When performing data transformation using a method other than FFT in the computer 101, for example, wavelet transform, the printer 104, of course, performs data transformation of the image data of the fingerprint pattern using the wavelet transform. The situation is the same when embedding the image data of the fingerprint pattern in the print data using electronic watermark in the computer 101.

Then, the fingerprint pattern subjected to encryption transmitted from the computer 101 is decoded using a secret key B shown in FIG. 8 (to be described later). The decoded fingerprint pattern is read by the fingerprint reader 105 and is matched with the fingerprint pattern subjected to data transformation. The matching may be performed according to a known pattern matching method.

Figure 3:
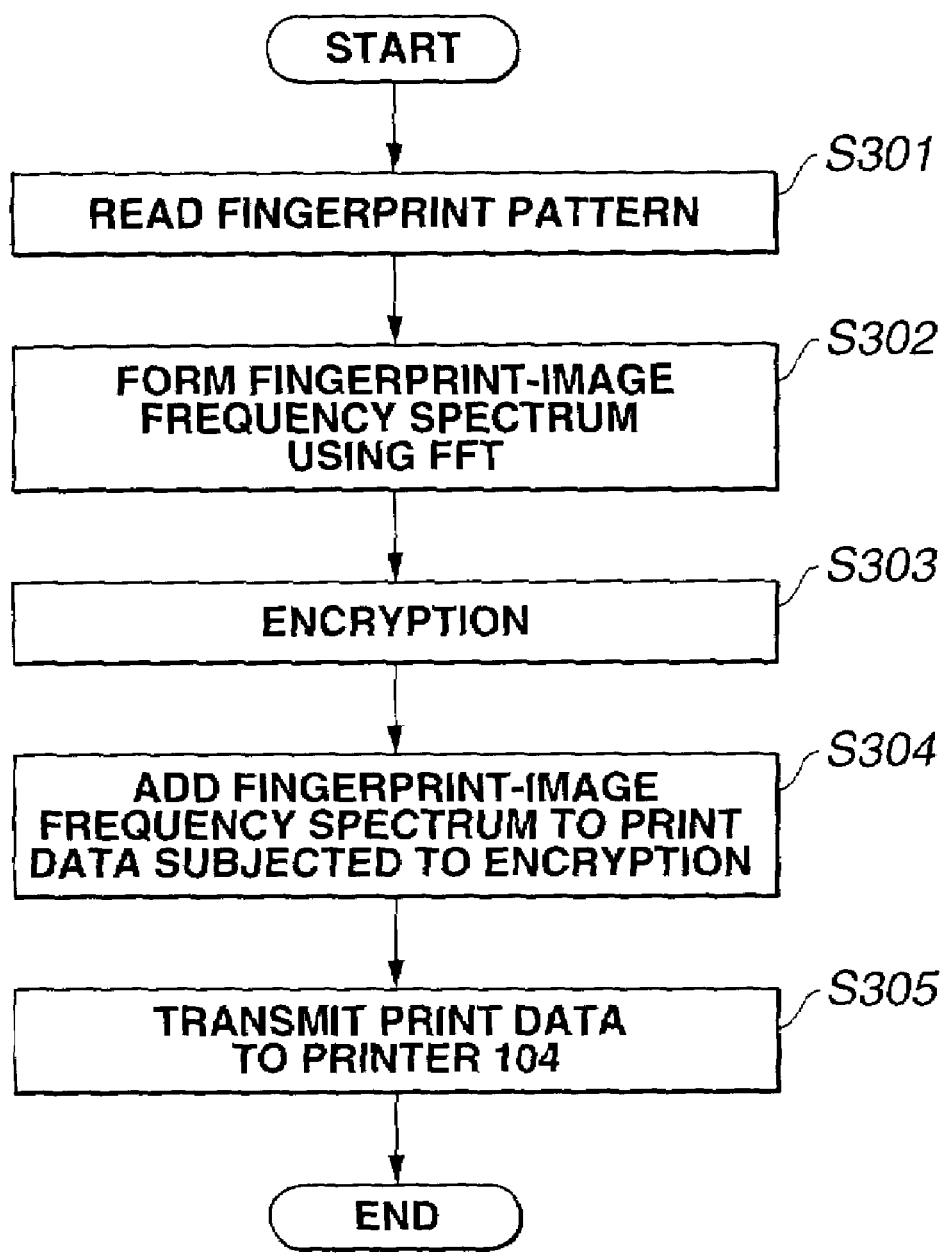
FIG. 3 is a flowchart illustrating the operation of a computer used in the first embodiment.

FIG. 3 is a flowchart illustrating the operation of the computer 101.

In step S301, the fingerprint pattern is read using the fingerprint reader 102.

Figure 5:
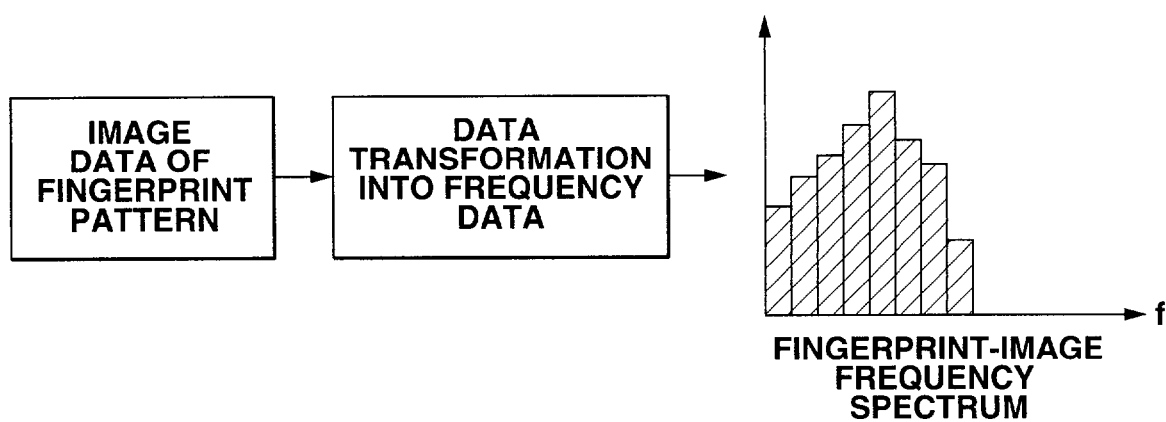
FIG. 5 is a diagram illustrating generation of a fingerprint-image frequency spectrum.

In step S302, image data of the fingerprint pattern read by the fingerprint reader 102 is subjected to data transformation using FFT as shown in FIG. 5, to form a fingerprint-image frequency spectrum.

Figure 8:
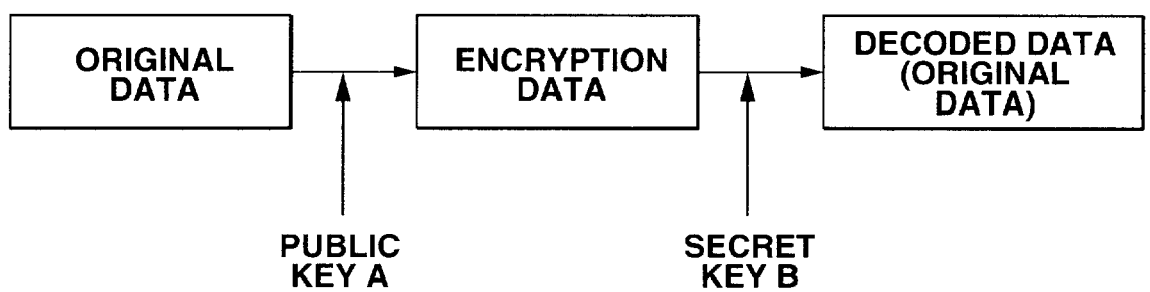
FIG. 8 is a diagram illustrating a public-key encryption (an encryption not to be dealt with)

In step S303, the fingerprint-image frequency spectrum obtained in step S302 is subjected to encryption according to public-key cryptography shown in FIG. 8.

Figure 6:
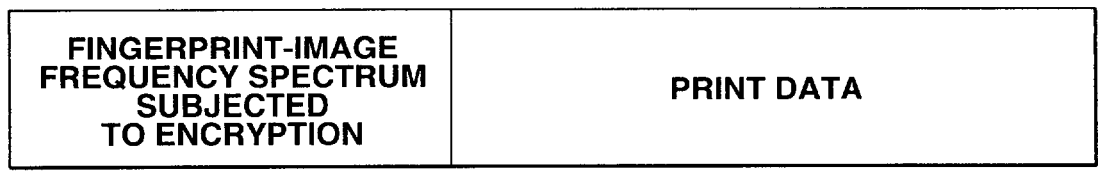
FIG. 6 is a diagram illustrating the format of data transmitted from the computer to the printer.

In step S304, the fingerprint-image frequency spectrum subjected to encryption is added to the print data in the format shown in FIG. 6.

In step S305, the print data is transmitted from the computer 101 to the printer 104 via the transmission channel 106.

Figure 4:
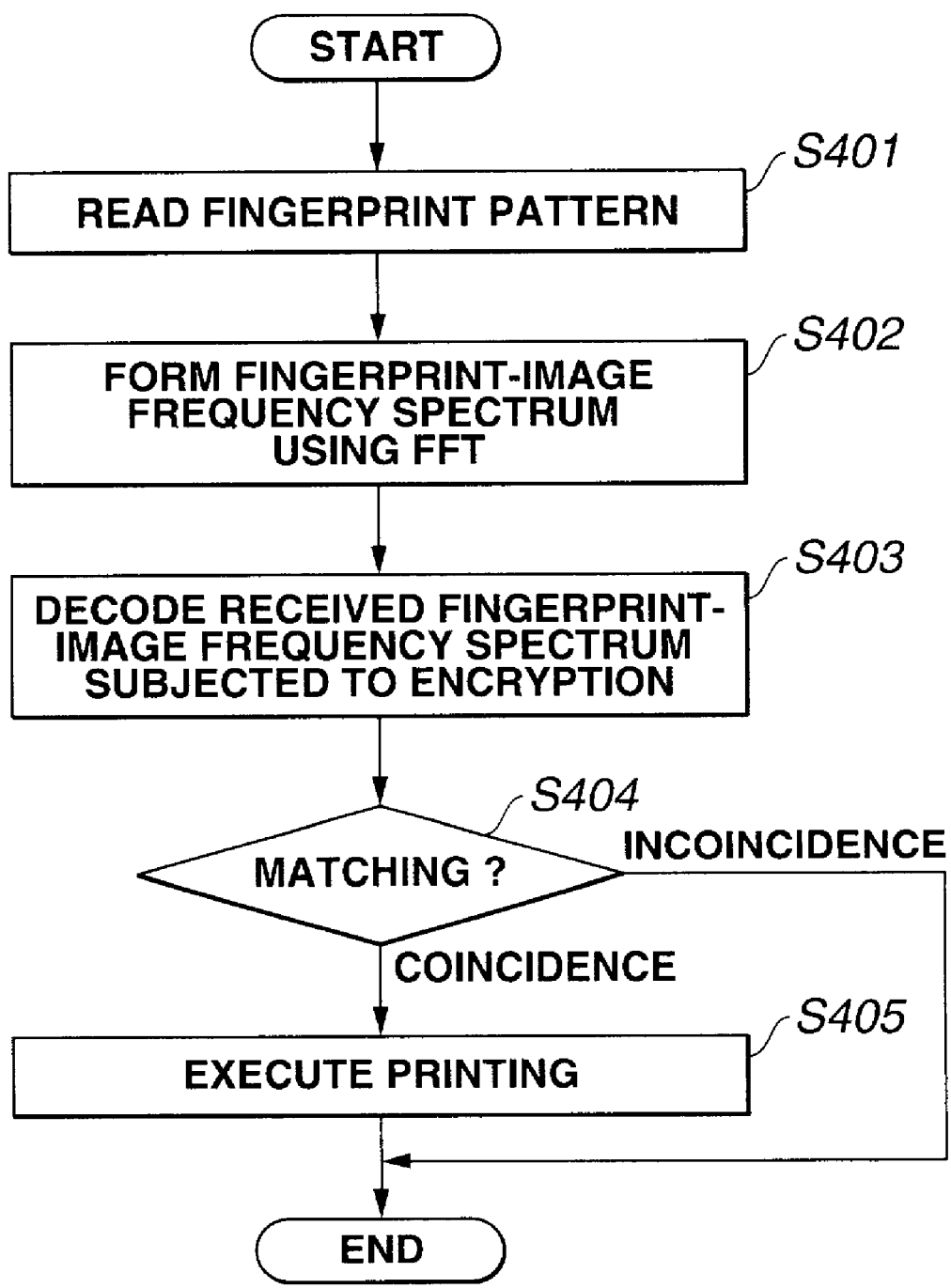
FIG. 4 is a flowchart illustrating the operation of a printer used in the first embodiment.

FIG. 4 is a flowchart illustrating the operation of the printer 104.

In step S401, a fingerprint pattern is read using the fingerprint reader 105.

In step S402, image data of the fingerprint pattern read by the fingerprint reader 105 is subjected to data transformation using FFT according to the method shown in FIG. 5, to form a fingerprint-image frequency spectrum.

In step S403, the fingerprint-image frequency spectrum subjected to encryption using a public key A which has been transmitted from the computer 101 is decoded using the secret key B shown in FIG. 8.

In step S404, the fingerprint-image frequency spectrum obtained in step S402 is matched with the fingerprint-image frequency spectrum transmitted from the computer 101 which has been obtained in step S403. When the two spectra coincide with each other, printing execution processing in step S405 is performed.

FIG. 5 is a diagram illustrating the flow of generation of a fingerprint-image frequency spectrum from image data of a fingerprint pattern read by the fingerprint reader 102 or 105. This technique is known, and is, for example, described in detail in Japanese Patent Application Laid-Open (Kokai) No. 10-275203 (1998). Since the contents of FIG. 5 have already been described, further description thereof will be omitted.

FIG. 8 is a diagram illustrating a public-key encryption (an encryption not to be dealt with). Encryption or decoding is performed using a pair of the public key A and the secret key B which are different from each other, respectively. According to this approach, organism information subjected to encryption can be decoded only by a user who knows the secret key B. Hence, the function of preserving the user's secret can be further improved.

As described above, according to the first embodiment, since the printer 104 assuredly authenticates a particular user based on organism information, such as fingerprint information or the like, when printing print data, it is possible to more assuredly prevent leakage of the print data to a person other than the user.

Furthermore, since organism information, such as fingerprint information or the like, is subjected to encryption and the information subjected to encryption is transmitted to a transmission channel, it is possible to preserve information relating to the user's secret.

Second Embodiment

A second embodiment of the present invention is substantially the same as the first embodiment. However, although in the first embodiment, the user inputs the user's fingerprint pattern directly to the computer 101 via a fingerprint reader, in the second embodiment, a card-type storage medium storing the user's fingerprint-image frequency spectrum is prepared. The fingerprint-image frequency spectrum is input to the computer 101 via a device for reading the storage medium.

Figure 7:
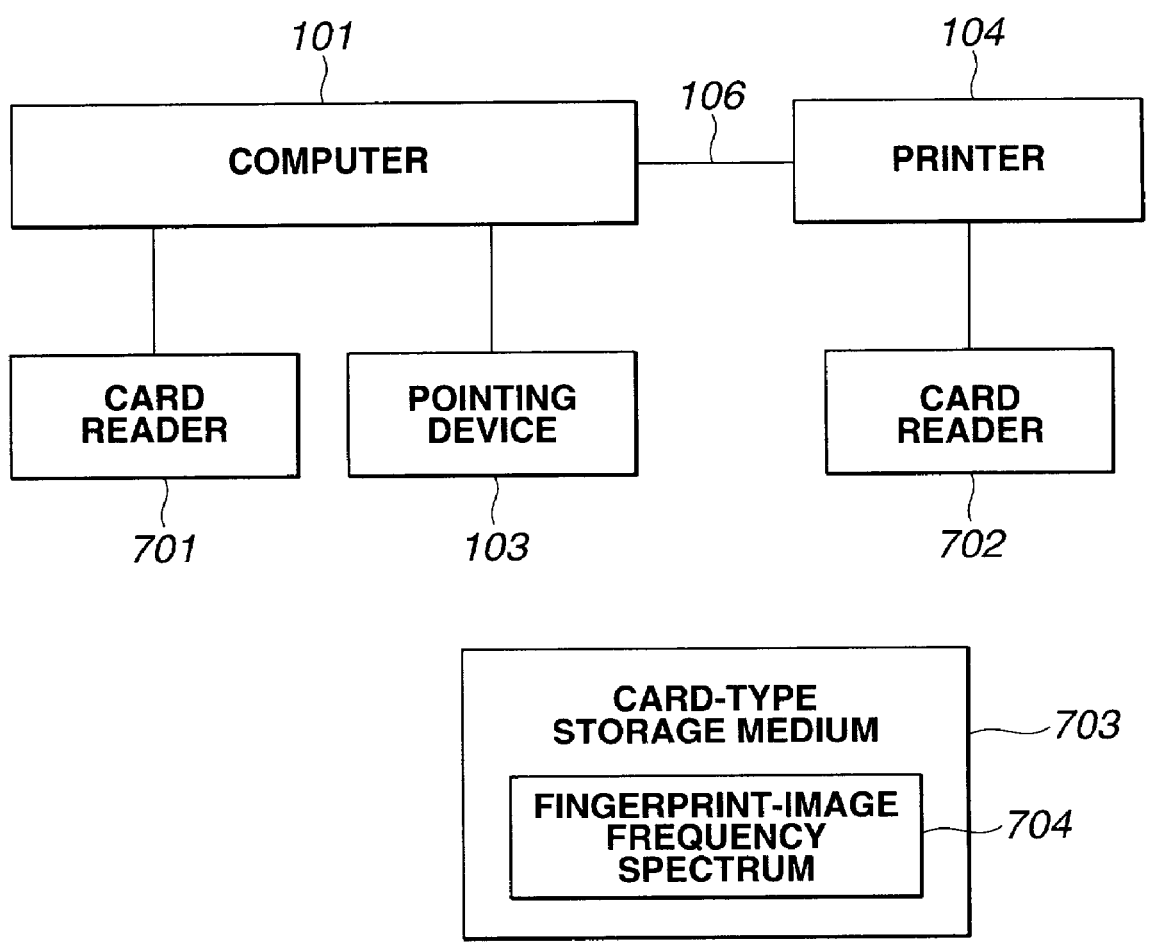
FIG. 7 is a block diagram illustrating a computer, a printer and a card-type recording medium in a second embodiment of the present invention.

FIG. 7 is a diagram illustrating the second embodiment. As described above, the fingerprint-image frequency spectrum is stored in advance in the card, serving as the storage medium, and authentication processing is performed using data read by a card reader connected to the computer and the printer.

In the processing of the second embodiment shown in FIG. 7, first, a card reader 701 connected to the computer 101 reads a fingerprint-image frequency spectrum 704 stored in a card-type storage medium 703. The computer 101 receives the fingerprint-image frequency spectrum 704 from the card reader 702, and performs encryption of the fingerprint-image frequency spectrum 704 to be transmitted to a printer 104 by performing the same processing as in the first embodiment. Print data formed or edited using a pointing device 103 is transmitted to the printer 104 via a data transmission channel 106.

The printer 104 decodes the received fingerprint-image frequency spectrum subjected to encryption, by performing the same processing as in the first embodiment. A card reader 702 connected to the printer 104 reads the fingerprint-image frequency spectrum 704 stored in the card-type storage medium 703. The succeeding processing is the same as in the first embodiment. That is, matching between the decoded fingerprint-image frequency spectrum 704 and the fingerprint-image frequency spectrum 704 read from the card-type storage medium 703 via the card reader 702 is performed.

In this case, since authentication of the user is performed using the same card-type storage medium in both of the card reader 701 and the card reader 702, the two spectra coincide with each other as the result of the matching. However, the matching when using card-type storage media storing different fingerprint-image frequency spectra for the card reader 701 and the card reader 702 will result in incoincidence, and authentication of the user fails.

Figure 9:
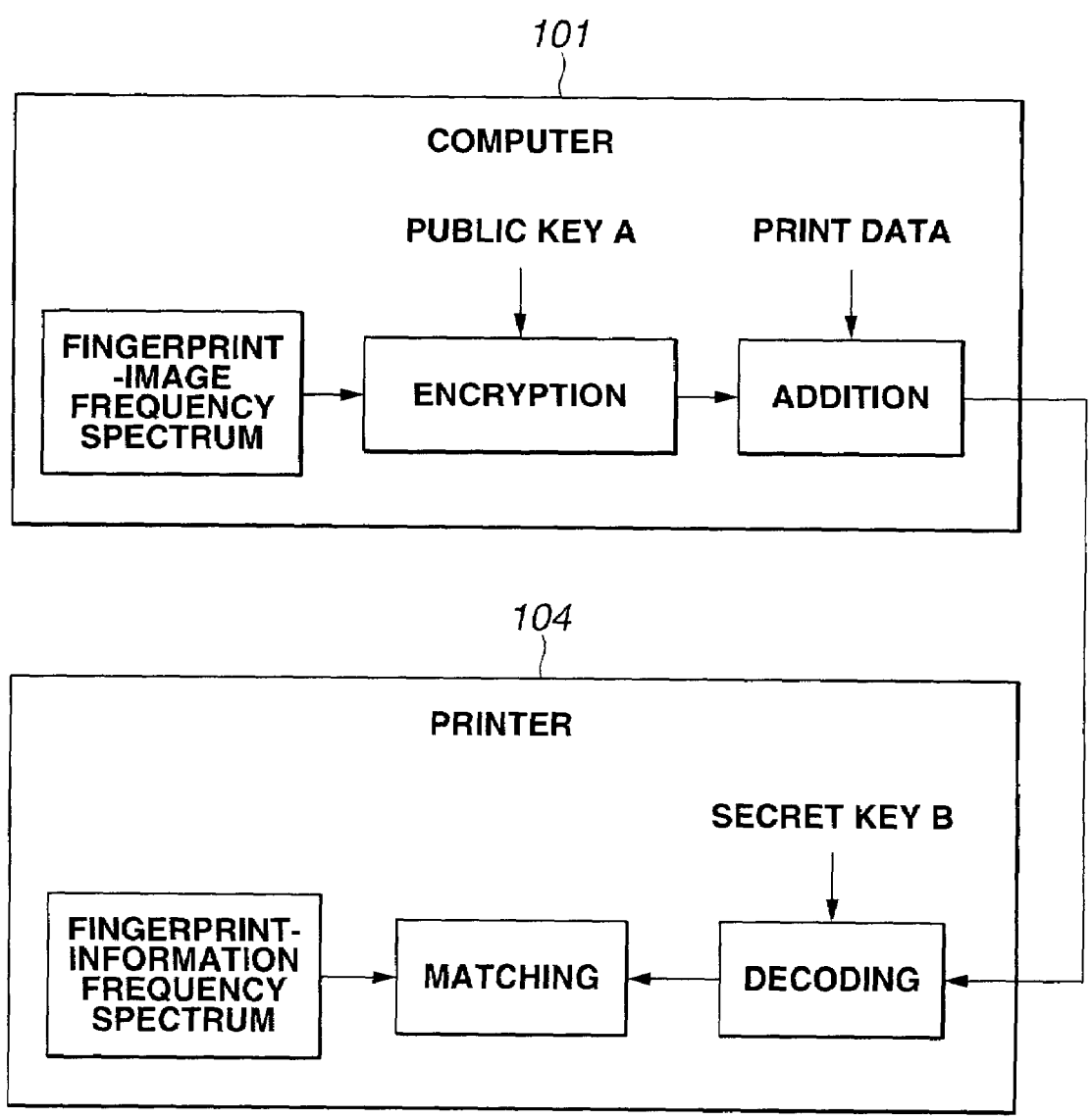
FIG. 9 is a diagram illustrating the contents of processing in the second embodiment.

FIG. 9 is a block diagram illustrating the processing described with reference to FIG. 7, i.e., the operations of the computer 101 and the printer 104. Further description relating to FIG. 9 will be omitted since the same operations described with reference to FIG. 7 are performed.

Figure 10:
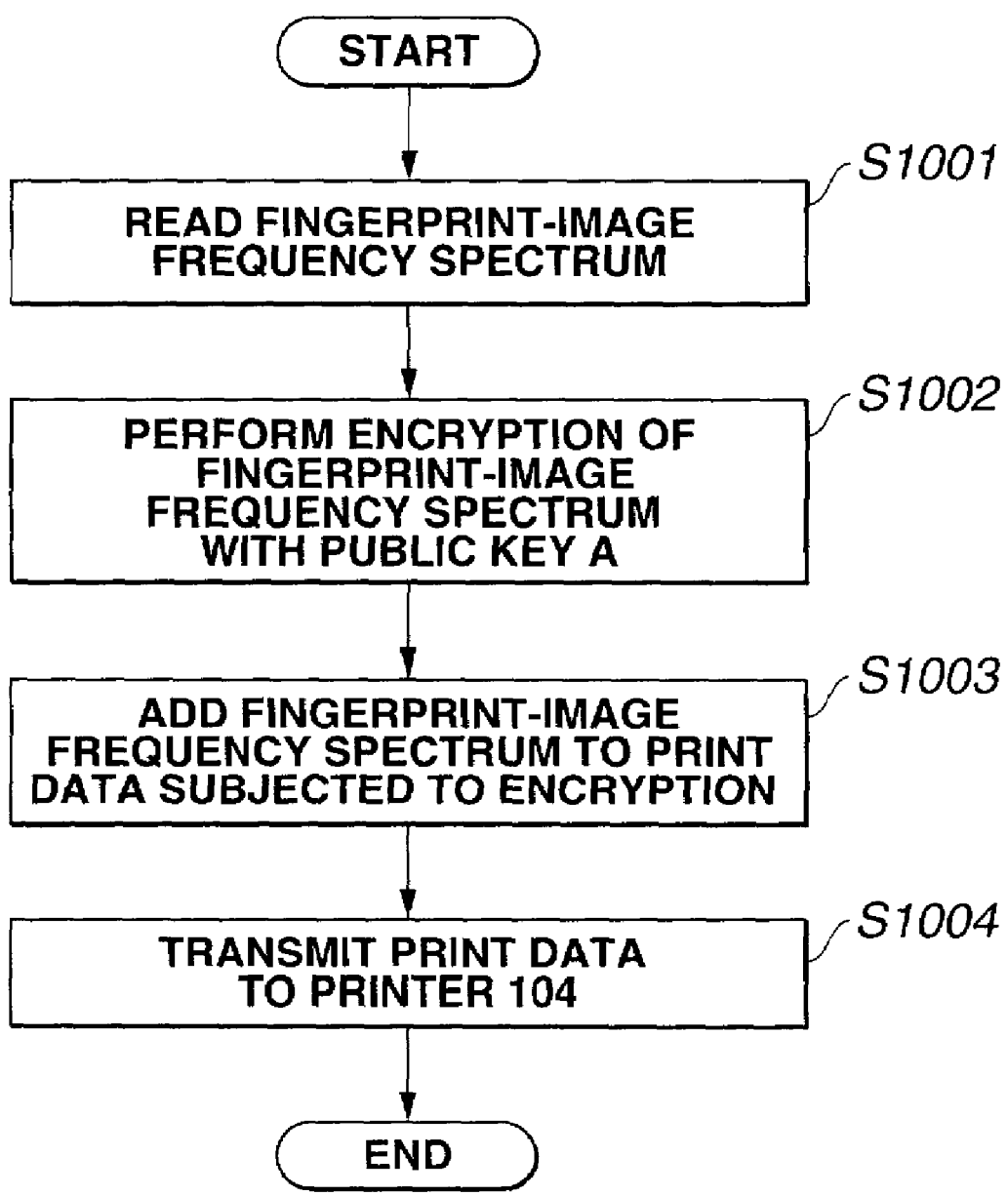
FIG. 10 is a flowchart illustrating the operation of a computer used in the second embodiment.

FIG. 10 is a flowchart illustrating the operation of the computer 101.

In step S1001, the card reader 701 connected to the computer 101 reads the fingerprint-image frequency spectrum 704 stored in the card-type storage medium 703.

Since processing starting from step S1002 is the same as the processing starting from step S302 shown in FIG. 3, further description thereof will be omitted.

Figure 11:
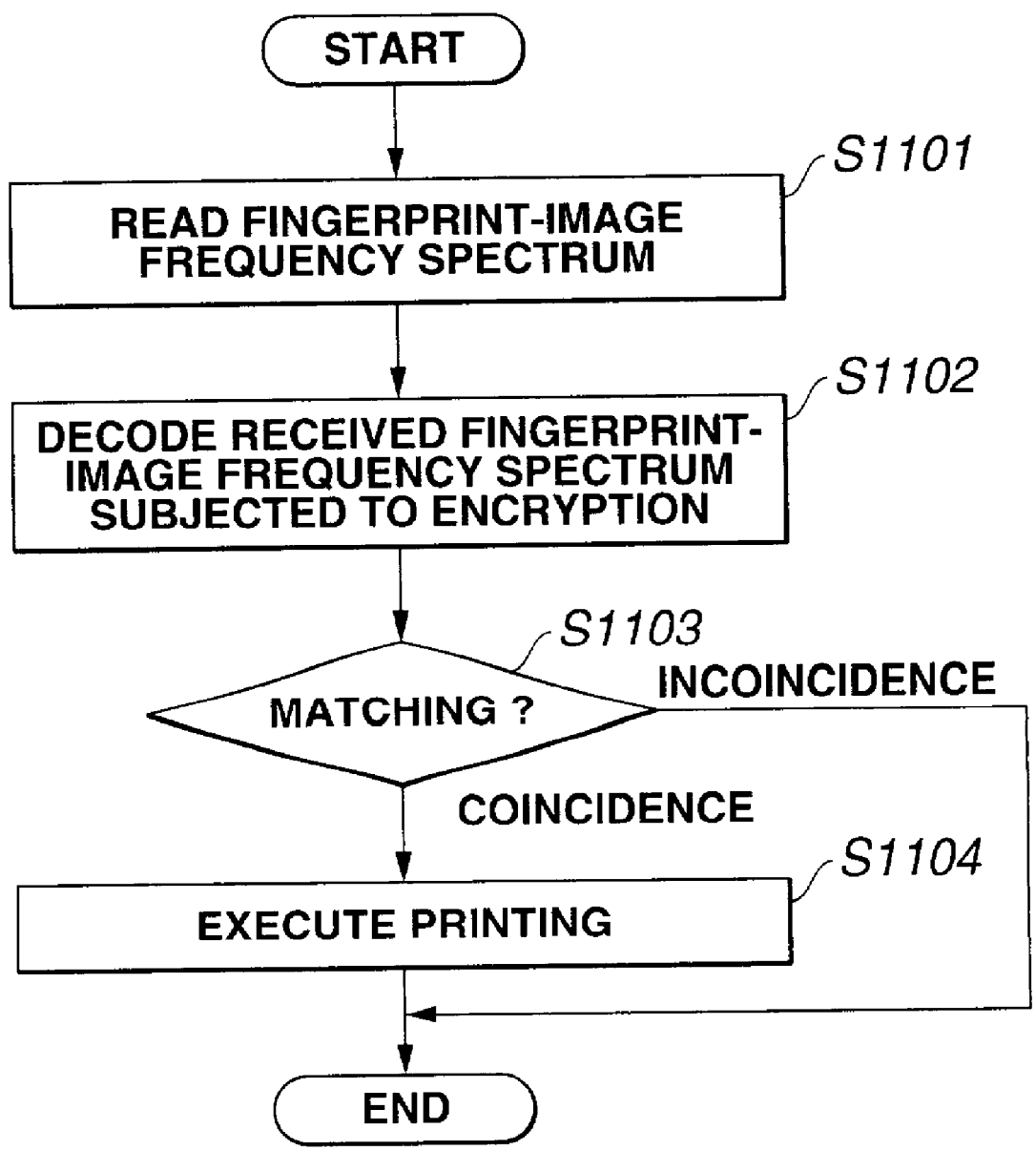
FIG. 11 is a flowchart illustrating the operation of a printer used in the second embodiment.

FIG. 11 is a flowchart illustrating the operation of the printer 104.

In step S1101, the card reader 702 reads the fingerprint-image frequency spectrum 704 stored in the card-type storage medium 703.

Since processing starting from step S1102 is the same as the processing starting from step S403 shown in FIG. 4, further description thereof will be omitted.

In the second embodiment, since the fingerprint-image frequency spectrum 704, serving as the user's peculiar information, is written in the card-type storage medium 703 and the stored information is read by the card readers 701 and 702, the problem that information relating to a fingerprint remains in an information reading unit (not shown) in the card readers 701 and 702 does not arise, and it is possible to more assuredly preserve the user's secret information.

Third Embodiment

In the first or second embodiment, a plurality of interfaces for inputting the user's organism information, i.e., a plurality of types of organism information to be input may be provided at the computer 101 and the printer 104. When only one set of organism information is to be input at the computer 101 or the printer 104, and there is a drawback in the user's organism information to be input, print data from the computer 101 cannot be printed by the printer 104. However, if input interfaces for inputting a plurality of sets of organism information are provided at the computer 101 or the printer 104, the user can select organism information which has no drawbacks and select an interface for inputting this organism information. At that time, it is necessary to take into consideration of a case in which the type of organism information to be input to the computer 101 is different from the type of organism information to be input to the printer 104. For example, when voice is input at the computer 101 and a fingerprint is input at the printer 104, it is necessary to perform matching between different types of organism information.

Figures 14, 15:
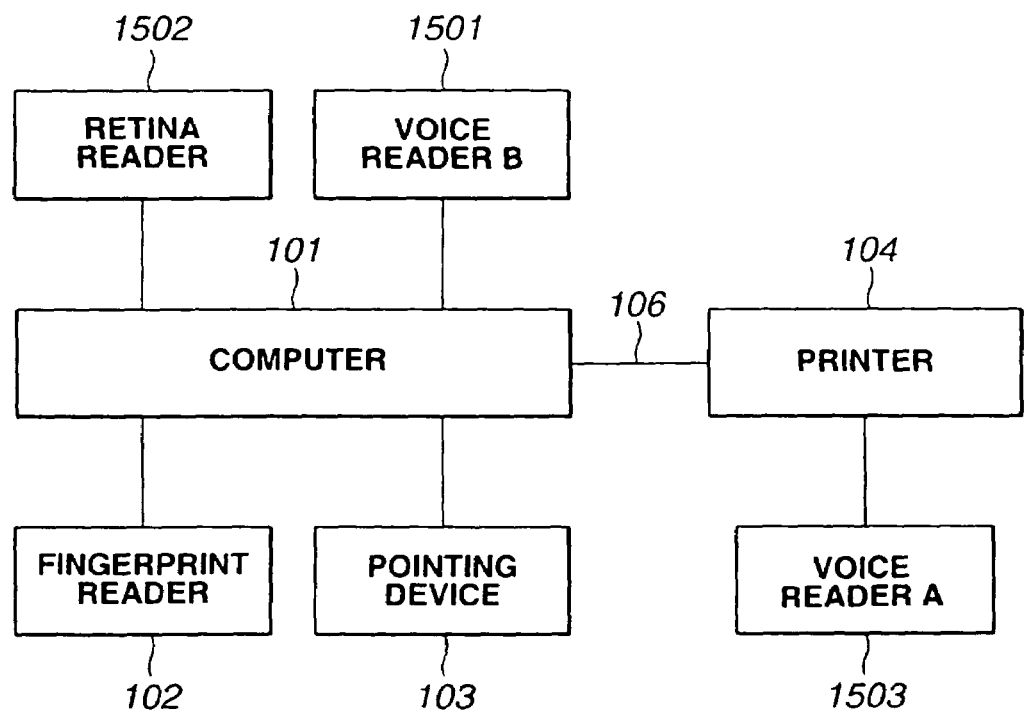
FIG. 14 is a diagram illustrating a plurality of sets of organism information of each of a plurality of users.
FIG. 15 is a diagram illustrating the configuration of a third embodiment of the present invention.

FIG. 15 illustrates the configuration of the third embodiment.

In FIG. 15, a voice reader A 1503 is an interface for inputting voice which is connected to the printer 104.

A retina reader 1502 is an interface for inputting a retina.

A voice reader B 1501 is an interface for inputting voice which is connected to the computer 101.

In FIG 15, a fingerprint reader 102, the retina reader 1502 and the voice reader B 1501 are connected to the computer 101, and the voice reader A 1503 is connected to the printer 104. A description will now be provided of determination such that, when inputting a fingerprint as the user's organism information at the computer 101 and voice is input as the user's organism information at the printer 104, whether or not both of the two different types of organism information belong to the user's organism information.

Sets of organism information whose number is larger than the number of types of organism information which can be used at the printer 104 are registered in advance in a memory within the computer 101. FIG. 14 illustrates a plurality of sets of organism information of a plurality of users which are registered in the RAM 1202 of the computer 101.

In the case of FIG. 14, each of three users, i.e., a user A, a user B and a user C, registers three types of organism information, i.e., a fingerprint, a retina, and voice.

For example, sets of organism information of the user A are a fingerprint A, a retina A, and voice A.

It is assumed that the user B has input a fingerprint in the fingerprint reader 102 at the computer 101. By performing the same processing as in the first or second embodiment for that fingerprint, a fingerprint-image frequency spectrum of the user B is generated and transmitted to the printer 104. At the same time, the computer 101 identifies the user who has input this fingerprint from the input fingerprint, using the data shown in FIG. 14. The name of the identified user is temporarily stored in the RAM 1202.

On the other hand, since voice is input instead of a fingerprint at the printer 104 as the user's organism information, encryption information relating to the fingerprint of the user B transmitted from the computer 101 is erased within the printer 104, and the printer 104 transmits a command to transmit voice data to the computer 101. Upon reception of this command, the computer 101 first refers to the user's name (the user B) stored in the RAM 1202. Since the user's name is the user B, voice B, serving as data of the voice of the user B, is subjected to the same processing as described above, and the resultant data is transmitted to the printer 104 as cipher information. The succeeding processing is the same as in the first or second embodiment.

Other Embodiments

The above-described first through third embodiments may be applied to a system comprising a plurality of apparatuses (such as a host computer, an interface apparatus, a reader, a printer and the like), or to an apparatus comprising a single unit (such as a copier, a facsimile apparatus or the like).

The objects of the above-described first through third embodiments may, of course, be achieved by supplying a system or an apparatus with a storage medium (or a recording medium) storing program codes of software for realizing the functions of the first through third embodiments, and reading and executing the program codes stored in the storage medium by means of a computer (or a CPU or an MPU (microprocessor unit)) of the system or the apparatus. In such a case, the program codes themselves read from the storage medium realize the functions of the first through third embodiments, so that the storage medium storing the program codes constitutes the first through third embodiments. The present invention may, of course, be applied not only to a case in which the functions of the first through third embodiments are realized by executing program codes read by a computer, but also to a case in which an OS (operating system) or the like operating in a computer executes a part or the entirety of actual processing, and the functions of the first through third embodiments are realized by the processing.

The present invention may, of course, be applied to a case in which, after writing program codes read from a storage medium into a memory provided in a function expanding card inserted into a computer or in a function expanding unit connected to the computer, a CPU or the like provided in the function expanding card or the function expanding unit performs a part or the entirety of actual processing, and the functions of the first through third embodiments are realized by the processing.

When applying the first through third embodiments to the above-described storage medium, program codes corresponding to the above-described flowcharts (shown in FIGS. 3 and 4, or in FIGS. 10 and 11) are stored in the storage medium.

The present invention has the effect of allowing an information reception apparatus, such as a printer or the like, to more assuredly identify a particular user by using the user's organism information.

The individual components designated by blocks in the drawings are all well known in the information transmission apparatus and information reception apparatus arts and their specific construction and operation are not critical to the operation or the best mode for carrying out the invention.

While the present invention has been described with respect to what are presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An information transmission apparatus for transmitting information to an information reception apparatus connected to the information transmission apparatus via a network comprising:

an input unit adapted to input a plurality of types of first identification information for identifying a user, wherein said first identification information can be used by the information reception apparatus to determine whether the first identification information coincides with second identification information for identifying the user inputted by the information reception apparatus;

an acquiring unit adapted to acquire specifying information which specifies a type of said second identification information that can be input at the information reception apparatus; and a transmitting unit adapted to transmit information to be reproduced by said information reception apparatus together with said first identification information, of a type that is specified by said specifying information, to said information reception apparatus in a case where the type of said second identification information is available to said information transmission apparatus.

2. An information transmission apparatus according to claim 1, further comprising:

a receiving unit adapted to receive said specifying information from the information reception apparatus;

wherein said acquiring unit acquires said specifying information received by said receiving unit.

3. An information transmission apparatus according to claim 1, wherein said acquiring unit acquires said specifying information in a case where a type of said first identification information transmitted from said information transmission apparatus to the information reception apparatus is different from a type of said second identification information.

4. An information transmission apparatus according to claim 1, further comprising:
    an encryption unit adapted to generate encrypted data based on said first identification information,
    wherein said transmitting unit transmits said encrypted data to the information reception apparatus.

5. An information transmission apparatus according to claim 4, wherein said encryption unit generates encrypted data using public-key cryptography.

6. An information transmission apparatus according to claim 1,
    wherein said first identification information and second identification information includes organism information of the user, and
    wherein said input unit inputs plurality of types of organism information.

7. An information transmission apparatus according to claim 6, wherein said plurality of types of first identification information includes at least one of a fingerprint information, a retina information and a voice information.

8. An information transmission apparatus according to claim 6, further comprising:
    a reading unit adapted to read said organism information of the user; and
    a forming unit adapted to form a frequency spectrum based on the organism information read by said reading unit,
    wherein said input unit inputs said first identification information based on the frequency spectrum formed by said forming unit.

9. An information reception apparatus for receiving information to be reproduced from an information transmission apparatus connected to the information reception apparatus via a network comprising:
    an input unit adapted to input second identification information for identifying a user;
    a transmitting unit adapted to transmit specifying information which specifies a type of said second identification information which can be input at said information reception apparatus to the information transmission apparatus;
    a receiving unit adapted to receive information to be reproduced, together with first identification information for identifying the user, of a type that is specified by said specifying information, inputted by the information transmission apparatus in a case where the type of said second identification information is available to said information transmission apparatus;
    a determining unit adapted to determine whether said first identification information received by said receiving unit and said second identification information inputted by said input unit coincide with each other; and
    a reproducing unit adapted to reproduce said information to be reproduced, transmitted from said information transmission apparatus, in a case where said determining unit determines said first identification information and said second identification information coincide with each other.

10. An information reception apparatus according to claim 9, further comprising:
    a decoding unit adapted to decode said first identification information by decoding said data, which is encrypted, received by said receiving unit.

11. An information reception apparatus according to claim 10, wherein said first identification information is encrypted with public-key cryptography, and said decoding unit decodes said encrypted first identification information using a secret-key related to said public-key.

12. An information reception apparatus according to claim 9, wherein said first identification information and said second identification information includes organism information of the user, and wherein said input unit inputs said organism information for identifying the user.

13. An information reception apparatus according to claim 12, wherein a plurality of types of said first identification information includes at least one of fingerprint information, a retina information and voice information.

14. An information reception apparatus according to claim 12, further comprising:
    a reading unit adapted to read said organism information of the user; and a forming unit adapted to form a frequency spectrum based on the organism information read by said reading unit,
    wherein said input unit inputs said second identification information based on the frequency spectrum formed by said forming unit.

15. A method for controlling an information transmission apparatus for transmitting information to an information reception apparatus connected to the information transmission apparatus via a network comprising:
    an input step of inputting a plurality of types of first identification information for identifying a user, wherein said first identification information can be used by the information reception apparatus to determine whether the first identification information coincides with second identification information for identifying the user inputted by the information reception apparatus;
    an acquiring step of acquiring specifying information which specifies a type of said second identification information that can be input at the information reception apparatus; and
    a transmitting step of transmitting said first identification information, of a type that is specified by said specifying information, to said information reception apparatus in a case where the type of said second identification information is available to said information transmission apparatus.

16. A method for controlling an information reception apparatus for receiving information to be reproduced from an information transmission apparatus connected to the information reception apparatus via a network comprising:
    an input step of inputting second identification information for identifying a user;
    a transmitting step of transmitting specifying information which specifies a type of said second identification information which can be input at said information reception apparatus to the information transmission apparatus;
    a receiving step of receiving information to be reproduced, together with data related to plurality of types of first identification information for identifying the user of a type that is specified by said specifying information, inputted by the information transmission apparatus in a case where the type of said second identification information is available to said information transmission apparatus;
    a determining step of determining whether said first identification information and said second identification information inputted by said input unit coincide with each other; and
    a reproducing step of reproducing said information to be reproduced, transmitted from the information transmission apparatus, in a case where said determining step determines said first identification information and second identification information coincide with each other.

17. An information transmission system comprising:
an information transmission apparatus including:
  a first input unit adapted to input a plurality of types of first identification information for identifying a user, wherein said first identification information can be used by an information reception apparatus to determine whether the first identification information coincides with second identification information for identifying the user inputted by said information reception apparatus;
  an acquiring unit adapted to acquire specifying information which specifies a type of said second identification information that can be input at said information reception apparatus; and
  a transmitting unit adapted to transmit information to be reproduced by said information reception apparatus together with said first identification information, of a type that is specified by said specifying information, to said information reception apparatus in a case where the type of said second identification information is available to said information transmission apparatus; and
an information reception apparatus connected to the information transmission apparatus via a network including:
  a second input unit adapted to input second identification information for identifying a user;
  a receiving unit adapted to receive information to be reproduced, together with first identification information for identifying the user, of a type that is specified by said specifying information, inputted by the information transmission apparatus in a case where the type of said second identification information is available to said information transmission apparatus;
  a determining unit adapted to determine whether said first identification information received by said receiving unit and said second identification information inputted by said input unit coincide with each other; and
  a reproducing unit adapted to reproduce said information to be reproduced, transmitted from said information transmission apparatus, in a case where said determining unit determines said first identification information and said second identification information coincide with each other.

* * * * *

UNITED STATES PATENT AND TRADEMARK OFFICE
CERTIFICATE OF CORRECTION

PATENT NO.       : 7,159,121 B2
APPLICATION NO.  : 09/740860
DATED            : January 2, 2007
INVENTOR(S)      : Yoichi Takaragi It is certified that error appears in the above-identified patent and that said Letters Patent is hereby corrected as shown below:

Col. 1, line 31, "when if" should read --if the--.

Col. 7, line 52, "setting" should read --settings--.

Col. 13, line 15, "inputs" should read --inputs a--.
         line 20, delete "a", both occurrences.

Col. 14, line 11, delete "a".
         line 55, "to" should read --to a--.

Signed and Sealed this

Nineteenth Day of June, 2007

JON W. DUDAS
*Director of the United States Patent and Trademark Office*